United States Patent [19]

Egan et al.

[11] Patent Number: 5,102,072
[45] Date of Patent: Apr. 7, 1992

[54] ADAPTIVE GAIN AND PHASE CONTROLLER FOR AUTOPILOT FOR A HYPERSONIC VEHICLE

[75] Inventors: Murray C. Egan, Pleasanton; Frank D. Steketee, San Diego, both of Calif.

[73] Assignee: General Dynamics Corporation, Convair Division, San Diego, Calif.

[21] Appl. No.: 617,250

[22] Filed: Nov. 19, 1990

[51] Int. Cl.⁵ .................... G05D 01/08; F42B 10/00; F42B 15/01

[52] U.S. Cl. .................... 244/195; 244/3.21; 244/181

[58] Field of Search ............... 364/433, 434; 244/3.2, 244/3.21, 175, 177, 178, 181, 191, 194, 195; 73/583; 318/584, 585, 586

[56] References Cited

U.S. PATENT DOCUMENTS

| | | | |
|---|---|---|---|
| 3,215,374 | 11/1965 | Olshausen | 244/181 X |
| 3,740,002 | 6/1973 | Schaefer | 244/177 X |
| 4,122,448 | 10/1978 | Martin | 342/174 |
| 4,127,248 | 11/1978 | Boone et al. | 318/584 X |
| 4,129,275 | 12/1978 | Gerstine et al. | 244/181 |
| 4,189,116 | 2/1980 | Ehrich et al. | 244/3.16 |
| 4,791,573 | 12/1988 | Zemany et al. | 244/3.2 X |

Primary Examiner—Sherman Basinger
Assistant Examiner—Virna Lissi Mojica
Attorney, Agent, or Firm—John R. Duncan; Frank D. Gilliam

[57] ABSTRACT

An adaptive gain and phase controller for an autopilot for a flight vehicle, such as a hypersonic glide vehicle, that includes applying a reference excitation signal to the control system of a flight vehicle, measuring the response of the vehicle to that excitation signal, namely the gain and phase losses through airframe, and making adjustments to the gain and phase inputs to the autopilot based on those measurements. A high gain narrow bandpass filter is incorporated so that the test signal can be extracted from the airframe of the flight vehicle.

20 Claims, 2 Drawing Sheets

ADAPTIVE GAIN AND PHASE CONTROLLER FOR AUTOPILOT FOR A HYPERSONIC VEHICLE

FIELD OF THE INVENTION

This invention relates to an improvement in the field of adaptive flight control systems for a hypersonic vehicle and more particularly, but not by way of limitation, to an adaptive gain and phase controller to adjust autopilot gains in real time to control closed loop gain and closed loop phase based on response of the vehicle to a reference excitation signal, such system being particularly adapted for use with a hypersonic glide vehicle.

BACKGROUND OF THE INVENTION

In the real world, flight control systems operate in regimes where uncertain and unmodeled effects are encountered. In the hypersonic environment these effects may include variations in characteristics such as control surface effectiveness, aerodynamic parameters such as $C_{m-q}$, airframe and/or control surface ablation, and so forth. Along with the uncertainties, design changes and/or in-flight changes to the airframe may shift the location of the flight vehicle's center-of-gravity, thereby changing its dynamic response characteristics. These uncertainties, coupled with a flight envelope which may vary the operating conditions from those at trajectory insertion (Mach 20, dynamic pressure of approximately 50 psf) to terminal maneuver operation (Mach 20, dynamic pressure of approximately 10,000 psf), place a great burden on the flexibility of the flight control system. It is necessary to have a flight control system, or autopilot, which can accommodate this wide range of operation.

To provide a flight control system for a hypersonic vehicle such as a hypersonic flight vehicle presents a special control problem. The traditional method of accommodating a wide range of operating conditions, configuration changes, and modeling uncertainties is to design an autopilot with a high degree of "robustness". This is often accomplished by arriving at pint designs for a cross section of operating conditions, using the well known 6-db gain and 30 degree phase margin requirements, and linking these point designs in-flight through gain and/or filter parameter variations based on some in-flight measurement, such as dynamic pressure or axial acceleration. The drawback to this control solution is that it requires a extensive outlay of resources up-front to design, analyze, and tune the autopilot to the particular vehicle configuration and application at hand. In fact, it is often difficult and sometimes impossible to arrive at a design which will accommodate complete spectrum of operation.

For the Hypersonic Glide Vehicle (HGV), this "spectrum of operation" includes a variety of phases. The Glide Phase is preceded by a high altitude, double digit mach number insertion, with possible high tip off rates and off nominal release conditions. During the Glide Phase the HGV will encounter altitude/density phugoids, and possible density bubbles, while attempting to fly a rather benign trajectory with small maneuver requirements. A phugoid oscillation is usually a lightly damped long period oscillation. However, in certain circumstances in supersonic flight, this oscillation may become unstable or may be replace by a subsidence and a divergence. At the onset of the Terminal Phase the vehicle requirements change drastically, as does the operating environment. For example, the dynamic pressure may change from 300 psf to 10,000 psf in a matter of minutes as the HGV transitions from the Glide Phase environment to the Terminal Phase region. A complicated maneuver such as a high-g/rolling maneuver to avoid a threat, may then be performed as the HGV proceeds enroute to a target.

Because of the wide operating range requirement, an HGV autopilot design which somehow adapts to changing operation conditions seems a desirable choice. In this context an adaptive autopilot is one which measures the response of the vehicle to a known excitation signal and uses these measurements to control certain autopilot parameters.

The HGV adaptive control design must satisfy certain ground rules. It must be compatible with the existing airframe without structural modification. The autopilot is also constrained to utilize existing control surfaces (elevons and rudder) and sensors currently envisioned for the HGV. Due to mission concerns, any control surface excitation signals must be of low frequency and small amplitude to conserve battery power throughout the entire flight. Computer cycle time is not considered to be a major design concern in light of the rate of advance in computer capability.

The prior art reveals two patents that are of general interest only. U.S. Pat. No. 4,122,448 issued Oct. 4, 1978 for an AUTOMATIC PHASE AND GAIN CONTROLLER FOR A BASEBAND PROCESSOR relates to a baseband processor for a moving target indicator (MTI) type radar system that includes an automatic phase and gain balance controller that utilizes a pilot signal for separately sensing phase and magnitude errors representative of the unbalance in the baseband processor channels which generate the inphase and quadrature components and nulling these sensed errors by providing balancing adjustments in the channels. This patent relates only to adjustments in a radar system and does not relate to the control of the parameters of an autopilot system for a hypersonic flight vehicle as seen in the present invention.

U.S. Pat. No. 4,129,275 issued Dec. 12, 1978 for an AUTOMATIC FLIGHT CONTROL APPARATUS FOR AIRCRAFT discloses a flight control system which uses a reference signal representing the desired attitude of the aircraft in a balanced relation to the actual air speed thereof and using the difference signal between the reference signal and a signal representing the actual attitude of the aircraft as one of the control parameters. The disclosed flight control apparatus also teaches a limiter for preventing unstable flight which would be caused by the feeding of an excessively large difference signal to the control system of the aircraft.

SUMMARY OF THE INVENTION

Briefly stated, the present invention relates to a novel adaptive gain and phase controller for a flight control system for a hypersonic vehicle, as the HGV, which includes a means to apply a reference excitation signal in the form of a sinusoidal dither signal to a control surface of the HGV. The response of the airframe of the HGV is sensed as by a Inertial Measurement Unit (IMU) and coupled to a computer means which determines the error between the actual and the desired gain and phase. The computer means then computes new autopilot gains that are coupled to an autopilot for control of the HGV.

DESCRIPTION OF THE PREFERRED EMBODIMENT

Figure 1:
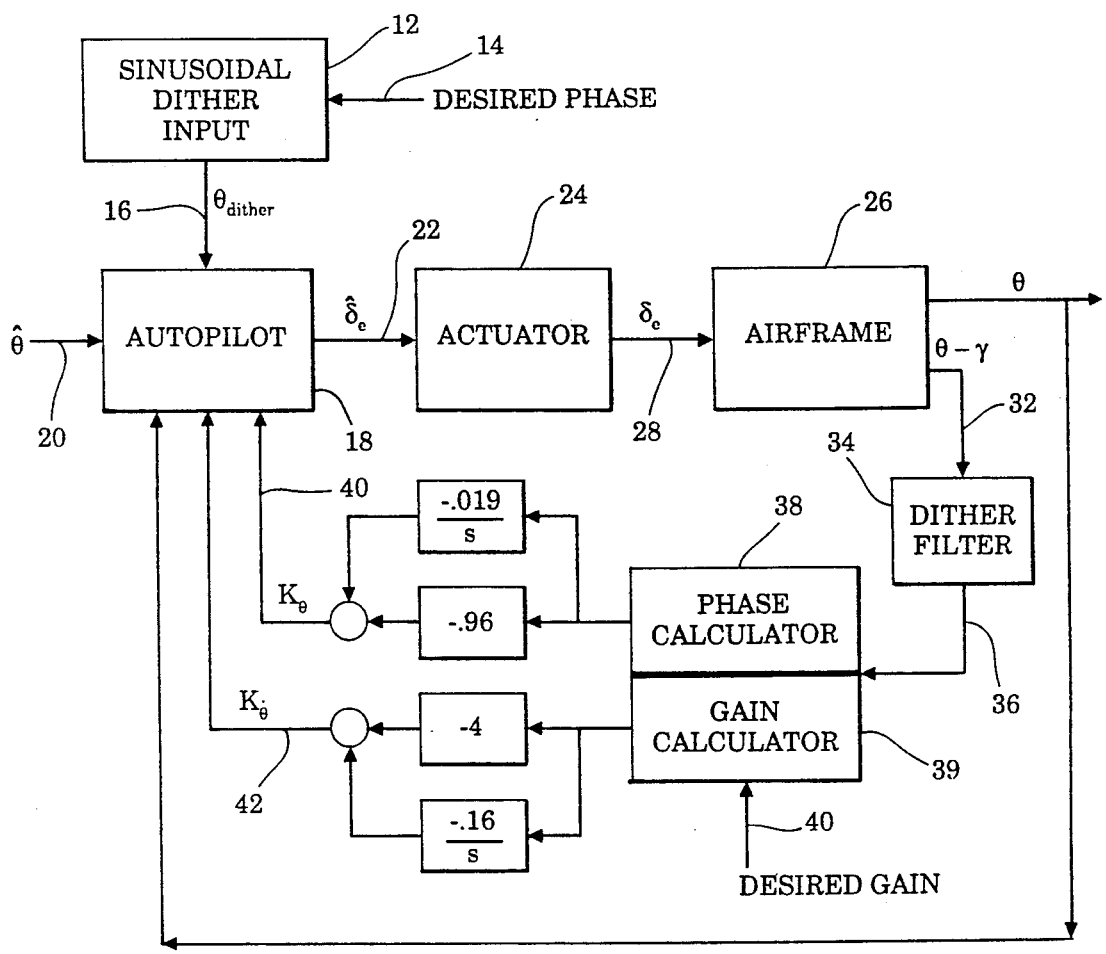
FIG. 1 is a simplified schematic representation of an adaptive gain and phase controller for an autopilot of a hypersonic vehicle that embodies the present invention.

Referring now to the drawings in detail, and in particular to FIG. 1, reference character 10 generally designates an adaptive gain and phase controller for HGV as constructed in accordance with a preferred embodiment of the present invention. The adaptive controller 10 includes a means for applying a reference signal to the airframe of a HGV. In the illustrated embodiment of the invention, this means includes a suitable dither input means 12 that receives a desired phase input 14 and couples a sinusoidal dither signal $\theta$ dither to suitable autopilot 18 which also receives the command Pitch Attitude (Theta-command, $\theta$ 20. The autopilot 18 then applies the control surface command signal 22 which represents the imposition of the dither signal on the pitch angle feedback to an actuator 24 of a control surface, such as the elevator of the HGV, to perturb the elevator 25 and thereby cause airframe 26 to be perturbed by the elevator motion signal 28.

Figure 2:
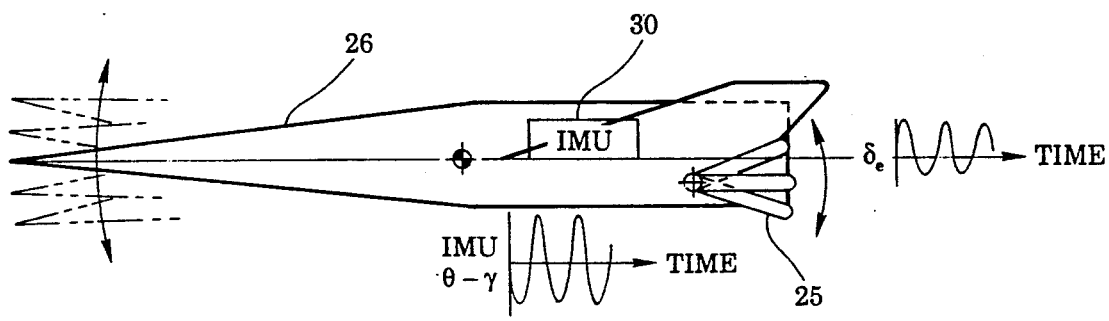
FIG. 2 is a simplified representation of an air frame that has had impressed on a control surface thereof a reference excitation signal and represents the response thereto.

Referring for the moment to FIG. 2, it will be seen that when the airframe 26 is perturbed by the elevator motion signal 28 applied to the elevator 25 a corresponding perturbation occurs in IMU 30. This perturbation in FIG. 2 is shown as being highly exaggerated for purposes of illustration. A means is provided to sense the response from the airframe to the reference excitation signal provided by the sinusoidal dither input. A suitable Inertial Measurement Unit (IMU) 30 carried by the airframe 26 provides two readily available outputs $\theta$ and $\gamma$, the pitch attitude and the flight path angle respectively. These two outputs of the IMU 30 provide a signal on the output 32 that represents an approximation of the Angle Of Attack (AOA).

The output 32 is coupled to a suitable dither filter 34 to extract the dither signal. Preferably, the dither filter 34 is a high Q (Q=½×filter damping=6.3) narrow bandpass filter that is matched to the dither frequency of the control signal. An analog filter, expressed as a zero divided by a low-damped second order, was used in initial analyses of the invention. Using a pole-mapping technique this filter mapped to the z-domain to yield a second order digital filter. This technique was used because of its ease of implementation and because it minimizes warping effects encountered when mapping from the s-plane to the z-plane.

During periods of signal loss, the bandwidth of the filter is increased to aid in phase-lock recovery. Examples of phenomena which induce signal loss include actuator rate limits and transients associated with vehicle dynamics at trajectory insertion. To compensate for this signal loss the filter damping is increased to 0.3 (Q=1.7) and then toggled back to a nominal value of 0.08 (Q=6.3), 0.5 seconds after the disturbance has subsided.

Figure 4:
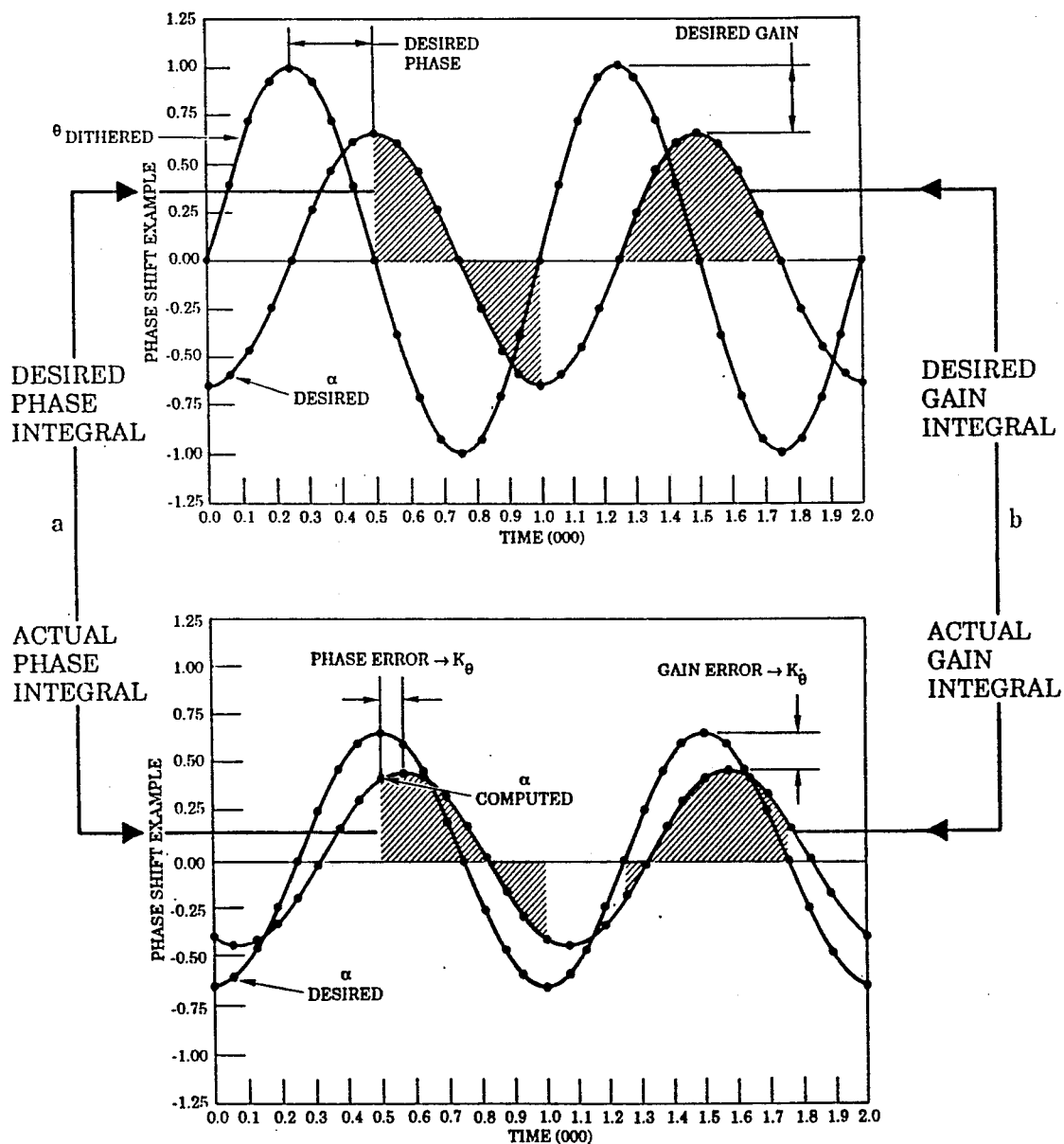
FIG. 4 is a representation of the proportional plus integral logic used to provide updates of the gain and phase signals in the adaptive controller of FIG. 1.

The output 36 of the dither filter 34 is coupled to a computer means which is adapted to compute a closed loop gain signal and a closed loop phase signal for input to the autopilot 18. In the illustrated embodiment of the invention, the output 36 of the dither filter 34 is coupled to phase and gain calculators 38 and 39, the gain calculator also receiving the desired gain on input 40. The phase calculator 38 integrates the filter output 36 over half of the dither period, updating the integral at twice the frequency of the dither input. The integrator is synchronized in time with the input sinusoid, such that the resulting integral update represents a measurement of the closed loop phase. The "imbalance" of the phase integral is shown in FIG. 4. This summation is used to compute $K_\theta$. Subsequently, changes in $K_\theta$ shift the dither filter output waveform to the left or right to effectively change the closed loop phase. For example, the letter a in FIG. 4 shows the positive phase integral (resulting from a 1 hz input dither with 108 degrees of phase shift between Dither and computed AOA, rather than the desired 90 degrees of phase) is used to increase $K_\theta$ in the proportional plus integral logic. The increase in $K_\theta$ has the effect of increasing the natural frequency of the system and decreasing the close loop phase at the dither frequency to the desired 90 degrees. To change the commanded value of closed loop phase, a phase bias is added to the dither input signal and the proportional plus integral computation of $K_\theta$ causes the phase to shift by a corresponding number of degrees.

The gain calculator 39 uses the absolute value of the phase integral to adaptively change $K_{\dot\theta}$. This integrand is output at twice the input dither rate, then scaled and used to compare with a desired gain. Using the difference between the actual gain and the desired gain to compute $K_\theta$, the amplitude of the waveform in FIG. 4 is shifted up or down, resulting in an effective change in the closed loop gain at the dither frequency. For example, at letter b in FIG. 4, the negative value which is obtained from subtracting the desired gain area from the actual gain area is used to decrease $K_{\dot\theta}$ in the proportional plus integral logic. This has the effect of increasing the closed loop gain at the dither frequency to the desired value of 0.7 (−3 db).

Thus, by adaptively changing $K_\theta$ and $K_{\dot\theta}$ the output dither signal is shaped to a desired sinusoid. This is synonymous with establishing a closed loop gain and phase at the test frequency. The updates of $K_\theta$ and $K_{\dot\theta}$ are then applied on leads 40 and 42 as inputs to the autopilot 18 for control of the closed loop bandwidth and damping of the autopilot 18.

The computing means represented by the phase and gain calculators 38 and 39 also provide for the handling of two irregularities that may be added to the computations of $K_\theta$ and $K_{\dot\theta}$. The first non-linearity was a "clamp" on current values of $K_\theta$ and $K_{\dot\theta}$ when the elevator actuator reaches its rate limit. Currently a rate limit is sensed by computing the rate of change of the elevator command in the autopilot. When this occurs the elevator dither does not get through the airframe and erroneous values are computed by the phase and gain calculators 38 and 39.

The second clamp on updates of $K_\theta$ and $K_{\dot\theta}$ occur during $\theta$ steps. Again, bad values of filter AOA are computed during times when large step commands are added to the dither signal due to the frequency content in the step. This condition is sensed by looking at values of $\theta$ which reside in front of the lag at the input as shown in FIG. 3.

Figure 3:
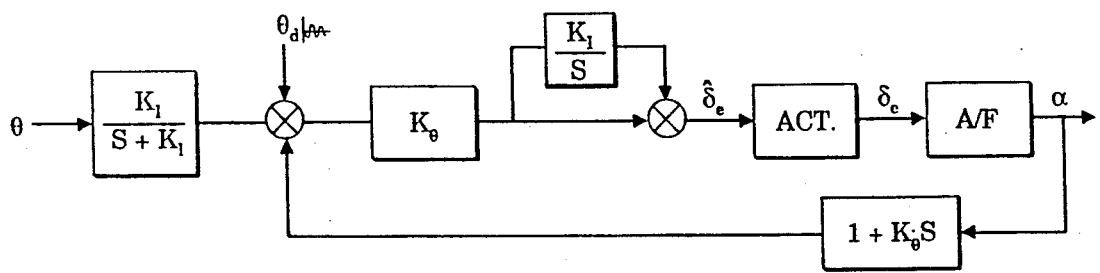
FIG. 3 is a linear representation of the adaptive controller of FIG. 1.

Referring now to FIG. 3, a linear representation of the adaptive gain and phase controller autopilot of the present invention is seen. Depicted here are the locations of the gains $K_\theta$ and $K_{\dot\theta}$ to which changes are made. Note the lag on theta, command, which was added to improve the time response characteristics of the system (less overshoot and smoother response), while not affecting inner loop dynamics. The sinusoidal dither command is the excitation signal against which the closed loop gain and closed loop phase at the output of the airframe are referenced.

Peculiar to the novel invention is that the selection of desired closed loop gains allows the designer to tailor the vehicle's response based on the vehicle's current flight environment, stability requirements and operational concerns. For instance, during vehicle insertion significant aerodynamic uncertainties exist. Thus, a low closed loop phase (high $K_\theta$) is commanded to insure closed loop stability.

If the flight regime dictates a low-q glide phase then since benign maneuvers are expected, moderate closed loop gains and phase are commanded during this time period. The dither frequency would remain small as low dynamic pressures necessitate a low frequency vehicle response.

If the flight regime involves a mid course threat avoidance faster vehicle response may be obtained by increasing the dither frequency of the novel adaptive gain and phase controller of the present invention.

In the terminal phase of the flight, large maneuver requirements exist as probable terminal threats are encountered. To account for these maneuvers, closed loop frequency response is increased by increasing the dither frequency of the controller 10.

For an intercept flight regime, final target selection and target updates are received. Gains and phases are selected to allow for suitable closed loop performance which insures the desired impact conditions.

The illustrated novel gain and phase controller for a autopilot for a hypersonic vehicle has been implemented and successfully tested on the General Dynamics Corporation, Convair Division GD/C HGV 6DOF (Six Degree of Freedom computer simulation).

While the novel invention has been described in connection with its application as an adaptive gain and phase controller for an autopilot for a hypersonic glide vehicle, it is understood that the invention may be employed to advantage in other systems that are applicable to other vehicles without deviating from the principles and broad scope thereof.

What is claimed is:

1. An adaptive gain controller for a flight control system for a hypersonic vehicle which comprises:
   a reference excitation signal generated within said hypersonic vehicle;
   means for applying said reference excitation signal to the airframe of a hypersonic vehicle;
   means to sense the response from the airframe to the reference excitation signal;
   computer means coupled to the sensing means and adapted to utilize the responsive signal to compute a closed loop gain signal and a closed loop phase signal; and
   autopilot means coupled to the computer means and adapted to used said closed loop gain and phase signals for real time flight control of said hypersonic vehicle.

2. The adaptive gain and phase controller for an autopilot for a hypersonic vehicle of claim 1 wherein the reference excitation signal is applied to at least one control surface of the hypersonic vehicle.

3. The adaptive gain and phase controller of claim 2 wherein the reference excitation signal is a sinusoidal dither signal having a predetermined frequency and amplitude.

4. The adaptive gain and phase controller of claim 1 wherein the means to sense the response from the airframe to the reference excitation signal includes an inertial measurement unit.

5. The adaptive gain and phase controller of claim 3 wherein the control surface of the vehicle is an elevator that is perturbed by the dither signal to cause a corresponding motion of the vehicle.

6. The adaptive gain and phase controller of claim 4 wherein the inertial measurement unit senses the pitch attitude and the flight path angle as a computed approximation of the angle of attack of the vehicle.

7. The adaptive gain and phase controller of claim 1 which further includes a filter means that is coupled to the sensing means and matched to the dither frequency to thereby extract the dither component of the signal from the coupled angle of attack.

8. The adaptive gain and phase controller of claim 7 wherein the filter means is a narrow band pass filter and the frequency of the excitation dither signal is selected so as to elicit a motion in the airframe of the hypersonic vehicle that can be sensed only be the dither filter.

9. The adaptive gain and phase controller of claim 7 wherein the computing means utilizes the computed approximate angle to determine the actual closed loop gain and closed loop phase which are the compared with the desired closed loop gain and closed loop phase to generate the error difference therebetween, which differences are then used to compute new gain and phase signals for application to the autopilot means.

10. The adaptive gain and phase controller of claim 6 wherein the computer means integrates the computed approximate angle of attack over half of the period of the excitation dither signal and compares the result with amplitude and phase of the excitation dither signal to determine the actual closed loop gain and closed loop phase.

11. The adaptive gain and phase controller of claim 10 wherein the computing means utilizes the actual closed loop gain and closed loop phase in a comparison with the desired gain and phase to determine the error difference therebetween, which differences are then used to compute new gain and phase control inputs to the autopilot means.

12. The adaptive gain and phase controller of claim 11 which further includes a clamp means which precludes the new gain and phase control signals from exceeding certain predetermined limits.

13. The adaptive gain and phase controller of claim 12 which further includes a second clamp means that disenables the generation of new gain and phase signals when large step commands have been added to the dither excitation signal.

14. A method of providing an adaptive gain and phase control for a flight control system for a hypersonic vehicle which comprises the steps of:
   providing a reference excitation signal generated within said hypersonic vehicle;

applying said reference excitation signal to the airframe of said hypersonic vehicle;

sensing the response from the air frame to the reference excitation signal;

using the response signal to compute a closed loop gain and a closed loop phase signal; and coupling the closed loop gain signal and the closed loop phase signal to the autopilot of the hypersonic vehicle to provide real time flight control of said vehicle.

15. The method of claim 14 wherein the reference excitation signal is a sinusoidal dither signal having a predetermined frequency and amplitude.

16. The method of claim 15 wherein the reference excitation signal is used to perturb at least one control surface of the hypersonic vehicle to cause a resultant responsive motion of the vehicle.

17. The method of claim 16 wherein the response to the reference excitation signal is sensed as the pitch attitude and the flight angle path of the vehicle by an inertial measurement unit as a computed approximation of the angle of attack of the vehicle.

18. The method of claim 17 wherein the computing step includes utilizing the computed approximate angle of attack to determine the actual closed loop gain and the closed loop phase which are then compared with the desired closed loop gain and closed loop phase to generate the error difference therebetween and using such differences to compute new gain and phase signals for application to the autopilot.

19. The method of claim 18 wherein the computing step includes integrating the computed approximated angle of attack over half of the period of the excitation dither signal and comparing the result with amplitude and phase of the excitation dither signal to determine the actual closed loop gain and closed loop phase.

20. The method of claim 19 wherein the computing step also includes precluding the new gain and phase signals from exceeding certain predetermined limits.

* * * * *